Feb. 10, 1970  E. W. GOODY  3,494,147
FLEXIBLE COUPLINGS
Filed March 13, 1968  2 Sheets-Sheet 1
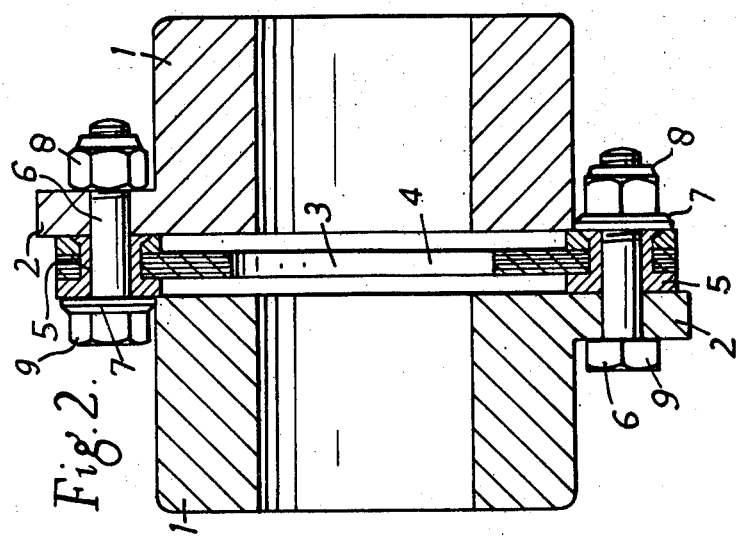
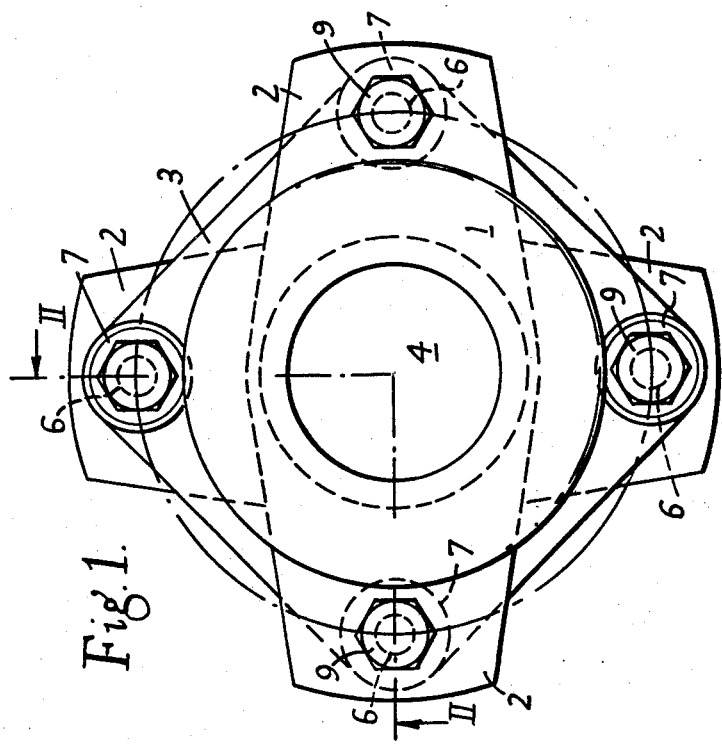
Inventor:
Edward W. Goody
BY Baldwin Wight Diller & Brown
Attorneys

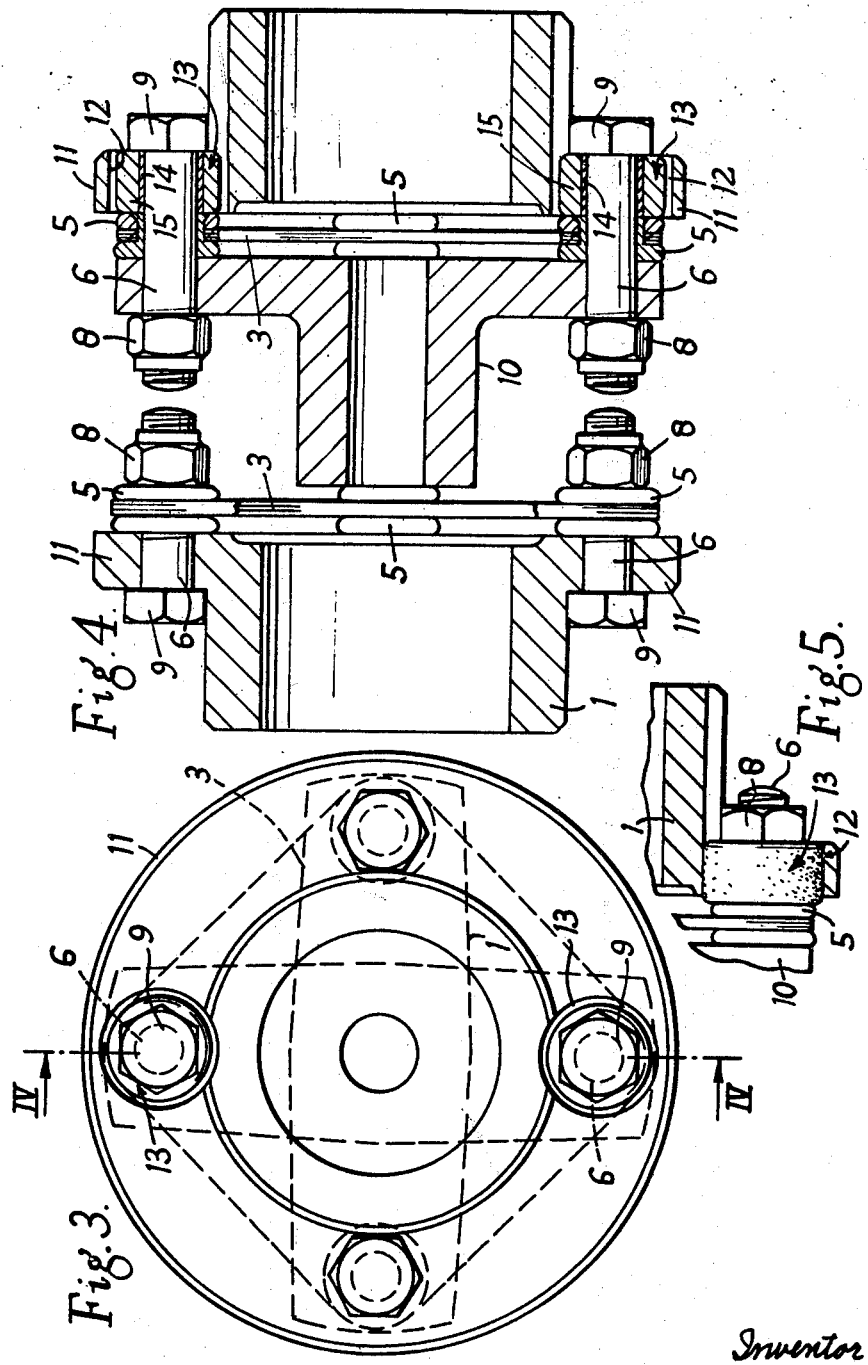

United States Patent Office 3,494,147
Patented Feb. 10, 1970

3,494,147
FLEXIBLE COUPLINGS
Edward W. Goody, Weybridge, Surrey England, assignor to Turboflex Ltd., Penn, England, a British company
Filed Mar. 13, 1968, Ser. No. 712,763
Claims priority, application Great Britain, Mar. 15, 1967, 12,266/67
Int. Cl. F16d 3/62
U.S. Cl. 64—12          6 Claims

ABSTRACT OF THE DISCLOSURE

A flexible coupling for transmitting rotational drive comprising two components connected together by a link of resilient material which is respectively connected to the components at points lying on a pitch circle or circles about the axis of rotational movement of the components, the links being connected to the components by pins which project beyond each component in a direction towards the other, the projecting portions carrying elements made from a non-ferrous material which will engage the other component in the event of flexible link failure.

---

This invention relates to flexible couplings for transmitting rotational drive and is particularly concerned with couplings of the kind comprising two components which are coupled together by links of resilient material, the link being respectively connected to the two components at points lying at a pitch circle or circles about the axis of rotational movement of the components. Couplings of this kind are described in the applicants British Patent No. 1,066,984 and Patent No. 923,141.

In this kind of coupling fracture of a link, which may be in the form of frame, or individual links, extending between the connection points to the components can sometimes allow relative rotational movement between the components themselves until the projecting pins, by means of which the flexible links are held in position, engage part of the other component. When the links are connected to radially projecting arms this occurs when the pin engages an arm or, if the flexible links are connected to radially projecting flanges can occur when the pin engage the sides of the opening into which it projects in the opposite flange. When this occurs there is a grave danger of sparking taking place and in certain atmospheres in which such couplings are used, such sparking could be dangerous.

The object of the present invention is to provide a construction in which the chances of such sparking taking place are decreased.

According to the present invention in a coupling of the kind set forth the flexible links are connected to the components by pins which project beyond each component in a direction towards the other, the projecting portions carrying elements made from a non-ferrous link failure.

Thus, the non-ferrous elements will engage the other component and prevent the pins doing so which will obviate sparking.

In a convenient arrangement each element is in the form of a washer or sleeve which is carried on the pin and this washer or sleeve may be made from brass or bronze.

In another arrangement the washer or sleeve may be made from rubber or the like and conveniently may comprise an inner tube of metal which carries a surrounding sleeve of rubber.

It will be appreciated that this construction can also be supplied to arrangements in which the two components to be connected are not affixed directly to a pair of shafts but are connected respectively to a shaft and a spacer which carries a resilient coupling at each end. Thus, the spacer can extend between a pair of shafts which are to be coupled together.

The invention may be performed in many ways and various embodiments will now be described by way of example and with reference to the accompanying drawings in which, FIGURE 1 is an end elevation of a coupling according to the invention, FIGURE 2 is a cross sectional side view on the line II—II of FIGURE 1, FIGURE 3 is an end elevation of an alternative arrangement, FIGURE 4 is a cross sectional side view of the arrangement shown in FIGURE 3 on the line IV—IV, and, FIGURE 5 is a detail view of part of another alternative construction.

In the arrangement to be described the coupling is of the kind set forth in British patent specification No. 1,066,984 and is intended to couple a pair of shafts (not shown). The end of each shaft is provided with a hub 1 which carries a pair of diametrically opposed radially extending arms 2 and these are arranged at right angles to each other and are connected together by a flexible link 3 which is in the form of a square frame 3 made up from a number of laminations of thin metal, as many as 68 laminations sometimes being used and which may have a central opening 4 of any suitable shape for example, square or circular.

Each corner of the square frame 3 is provided with a hole through which a hollow rivet 5 is passed to hold the laminations together and a bolt 6 is passed through a corresponding hole formed towards each end of the radially extending arms 2 on the hubs, and through the holes in the link frame, so that the link is connected to each hub at two points. Drive can now be transmitted through the bolts 6 which act as pins, via the flexible frame 3.

Each bolt 6 carries a large diameter bronze or brass washer 7 immediately beneath the head or the co-operating nut 8 which causes the bolt head 9 or the nut 8 to project well beyond the end of the other component so that it overlaps it. Thus, it will be appreciated that if the flexible frame 3 fails the drive between the two components will be taken up by the bolts 6 themselves, the washers 7 bearing against the sides of the radially extending arms 2 so that although the metal parts are in contact no sparking will occur due to the washers being made from non-ferrous material.

In another arrangement as shown in FIGURES 3 and 4 the coupling comprises a pair of hubs 2 arranged each side of a spacer 10, each end of the spacer being connected to a hub by flexible frames 3. In this arrangement the radially extending arms 2 on the hubs are replaced by radially extending flanges 11 which extend circumferentially around each hub 2. Holes 12 are provided in the flanges into which the projecting bolts 6 on the other component can extend. The washers 7 are replaced by washers or sleeves 13 made from rubber or similar resilient material and as shown these comprise an inner tube 14 of metal carrying a surrounding sleeve of rubber 15 although non-ferrous metal washers or sleeves could be used. Thus, once again in the event of failure the drive is taken up through the non-ferrous washers or sleeves, but in this case the amount of relative angular movement between the components is considerably reduced.

If desired flanges similar to those shown in FIGURES 3 and 4 could of course be used in the construction shown in FIGURES 1 and 2.

In yet another construction as shown in FIGURE 5 the outer surface of the rubber sleeve 13 of the kind shown in FIGURE 4 is arranged to be a tight fit in the holes 12 in the flanges 11 of the components so that the rubber sleeve 15 acts as an axial dumper for the coupling and provides a flexible drive in the event of link failure.

It will also be appreciated that couplings at present in existance can be made non-sparking by providing longer bolts and the appropriate non-ferrous washers, such a coupling as modified falling within the scope of the invention.

Although the above embodiments have been described in relation to couplings embodying two pins on each part to be coupled they could be used with couplings employing any number which was required for the transference of the power concerned.

What I claim is:

1. In a flexible coupling for transmitting rotational drive comprising two components connected together by a link of resilient material which is respectively connected to the components at points lying on at least one pitch circle about the axis of rotational movement of the components, the link being connected to the components by pins which project beyond each component in a direction towards the other, the improvement comprising the projecting portions of said pins carrying elements separate and apart from said link and made from a non-ferrous material which will positively drivingly engage the other component in a spark preventing manner in the event of flexible link failure.

2. A flexible coupling as claimed in claim 1 in which each element is in the form of a washer carried on the respective pin.

3. A flexible coupling as claimed in claim 2 in which the washer is made of a non-ferrous metal such as brass and bronze.

4. A flexible coupling as claimed in claim 2 in which the washer is made of rubber-like material.

5. A flexible coupling as claimed in claim 2 in which the washer comprises an inner tube of metal which carries a surrounding sleeve of rubber.

6. A flexible coupling as claimed in claim 2 in which the joint includes a spacer between the components.

References Cited

UNITED STATES PATENTS

| 1,145,602 | 7/1915 | Liber | 64—12 |
| 2,499,093 | 2/1950 | Fast | 64—13 |
| 3,023,593 | 3/1962 | Nallinger | 64—14 X |

FOREIGN PATENTS

| 696,076 | 8/1953 | Great Britain. |

HALL C. COE, Primary Examiner